(12) United States Patent
Nagao

(10) Patent No.: US 10,197,764 B2
(45) Date of Patent: Feb. 5, 2019

(54) LENS BARREL AND OPTICAL APPARATUS HAVING THE SAME

(71) Applicant: CANON KABUSHIKI KAISHA, Tokyo (JP)

(72) Inventor: Yuki Nagao, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 274 days.

(21) Appl. No.: 14/962,566

(22) Filed: Dec. 8, 2015

(65) Prior Publication Data
US 2016/0170172 A1   Jun. 16, 2016

(30) Foreign Application Priority Data
Dec. 10, 2014   (JP) .................. 2014-249776

(51) Int. Cl.
| | |
|---|---|
| *G02B 7/10* | (2006.01) |
| *G03B 9/02* | (2006.01) |
| *G03B 17/14* | (2006.01) |
| *G02B 7/02* | (2006.01) |
| *G03B 3/02* | (2006.01) |

(52) U.S. Cl.
CPC .............. *G02B 7/10* (2013.01); *G02B 7/022* (2013.01); *G03B 3/02* (2013.01); *G03B 17/14* (2013.01); *G03B 2205/0046* (2013.01)

(58) Field of Classification Search
CPC .......... G02B 7/022; G02B 7/10; G03B 17/14; G03B 3/02; G03B 2205/0046
See application file for complete search history.

(56) References Cited

U.S. PATENT DOCUMENTS

| | | | |
|---|---|---|---|
| 6,778,335 | B2 | 8/2004 | Takanashi |
| 7,027,727 | B2 | 4/2006 | Nomura |
| 7,050,244 | B2 | 5/2006 | Hayashi et al. |
| 7,050,713 | B2 | 5/2006 | Nomura |
| 7,307,803 | B2 | 12/2007 | Matsumoto et al. |
| 7,466,504 | B1 | 12/2008 | Koyama |

(Continued)

FOREIGN PATENT DOCUMENTS

| | | |
|---|---|---|
| CN | 1485637 A | 3/2004 |
| CN | 1485673 A | 3/2004 |

(Continued)

OTHER PUBLICATIONS

Office Action issued in Chinese Application No. 201510893834.4 dated Oct. 24, 2017. English translation provided.

(Continued)

*Primary Examiner* — William R Alexander
*Assistant Examiner* — Ephrem Z Mebrahtu
(74) *Attorney, Agent, or Firm* — Rossi, Kimms & McDowell LLP

(57) ABSTRACT

Provided is a lens barrel having a movable frame that moves in a direction of an optical axis of an imaging optical system and a cylinder member that is movable in the direction of the optical axis and is rotatable about the optical axis. A hole is provided in any one of the movable frame and the cylinder member and a shaft portion of a fitted member fitted into the hole is fitted into a groove provided in the other, and thereby the movable frame and the cylinder member are engaged.

13 Claims, 8 Drawing Sheets

(56) References Cited

U.S. PATENT DOCUMENTS

| | | | |
|---|---|---|---|
| 2005/0057822 A1* | 3/2005 | Hayashi | G02B 7/10 |
| | | | 359/694 |
| 2006/0023321 A1 | 2/2006 | Wada | |
| 2008/0180812 A1 | 7/2008 | Honsho et al. | |
| 2011/0149420 A1* | 6/2011 | Fukino | G02B 7/023 |
| | | | 359/823 |

FOREIGN PATENT DOCUMENTS

| | | |
|---|---|---|
| CN | 1637455 A | 7/2005 |
| GB | 2394560 A | 4/2004 |
| JP | H05075715 U | 10/1993 |
| JP | 11305103 A | 11/1999 |
| JP | 2002090609 A | 3/2002 |
| JP | 2005338415 A | 12/2005 |
| JP | 2007264220 A | 10/2007 |
| JP | 2014160120 A | 9/2014 |

OTHER PUBLICATIONS

Office Action issued in U.S. Appl. No. 14/962,327 dated Oct. 20, 2017.
Office Action issued in Japanese Appln. No. 2014-249776 dated Sep. 4, 2018. English translation provided.
Notice of Allowance issued in U.S. Appl. No. 14/962,327 dated May 30, 2018.

\* cited by examiner

LENS BARREL AND OPTICAL APPARATUS HAVING THE SAME

BACKGROUND OF THE INVENTION

Field of the Invention

The present invention relates to a lens barrel and an optical apparatus having the same.

Description of the Related Art

A lens barrel used for an optical apparatus such as a digital camera or a video camera and the like has a mechanism that moves lens holding members (lens holding frames) holding lens groups in a direction of an optical axis (optical axis of a imaging optical system) during, for instance, focusing by means of rotation of a rotary cylinder (cam cylinder).

In this mechanism, the cam cylinder having cam grooves, a guide cylinder (stationary cylinder) having a longitudinal groove (rectilinear groove) parallel to the direction of the optical axis, and cam followers engaged with both of grooves are used. The cam followers are fixed to the lens holding frames by screws, or the like. As the cam followers move in the direction of the optical axis due to rotation of the cam cylinder, the lens holding frames move in the direction of the optical axis.

In this lens barrel, the cam cylinder is rotated for zooming, and the plurality of lens holding frames supported in the plurality of respective cam grooves formed in the cam cylinder move. Especially, in a zoom lens of high power, the plurality of lens holding frames have different amounts of movement and great amounts of driving. For this reason, it was difficult to dispose the plurality of cam grooves having different trajectories on a circumference of the single cam cylinder in light of a space.

In a zoom lens device (lens barrel) disclosed in Japanese Patent Laid-Open No. 2007-264220, when a magnification is varied by driving a cam cylinder itself, each lens holding frame has an amount of movement that is divided into displacement of a corresponding cam groove provided in the cam cylinder in a direction of an optical axis and displacement of the cam cylinder itself in the direction of the optical axis. This reduces a length of each cam groove provided in the cam cylinder, and a plurality of cams for driving the respective lens holding frames are disposed in a space on a circumference of the cam cylinder.

Even in the lens barrel disclosed in Japanese Patent Laid-Open No. 2007-264220, it is still necessary to provide the cam grooves on the circumference of the cam cylinder equal in number to the movable frames such as the lens holding frames. Accordingly, when an attempt is made to dispose all of the plurality of cam grooves, the cam cylinder requires a length in the direction of the optical axis, and it is necessary to increase a diameter of the cam cylinder.

SUMMARY OF THE INVENTION

The present invention provides a lens barrel and an optical apparatus having the same, both of which reduce the number of cam grooves provided in a cam cylinder and a length and diameter of the cam cylinder in a direction of an optical axis.

The present invention provides a lens barrel having a movable frame that moves in a direction of an optical axis of a imaging optical system and a cylinder member that moves in the direction of the optical axis and rotates about the optical axis. A hole is provided in any one of the movable frame and the cylinder member and a shaft portion of a fitted member fitted into the hole is fitted into a groove provided in the other, and thereby the movable frame and the cylinder member are engaged.

Further features of the present invention will become apparent from the following description of exemplary embodiments with reference to the attached drawings.

DESCRIPTION OF THE EMBODIMENTS

Hereinafter, embodiments for carrying out the present invention will be described with reference to the drawings and the like. The present invention can be applied to a lens barrel (a lens device) of an imaging apparatus (optical apparatus) such as a lens integrated digital or video camera, but it will be described using an example of an interchangeable lens barrel.

First Embodiment

Figure 1A:
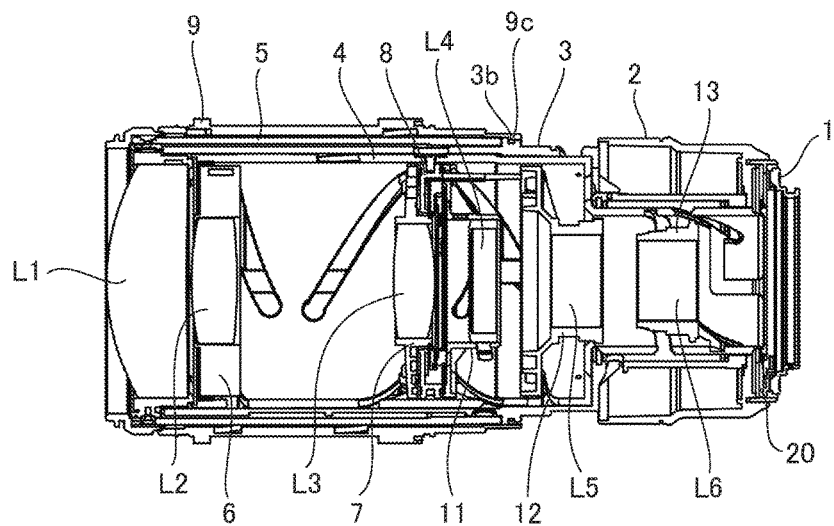
FIG. 1A is a sectional view illustrating a configuration of an interchangeable lens barrel according to a first embodiment in a wide state.
Figure 1B:
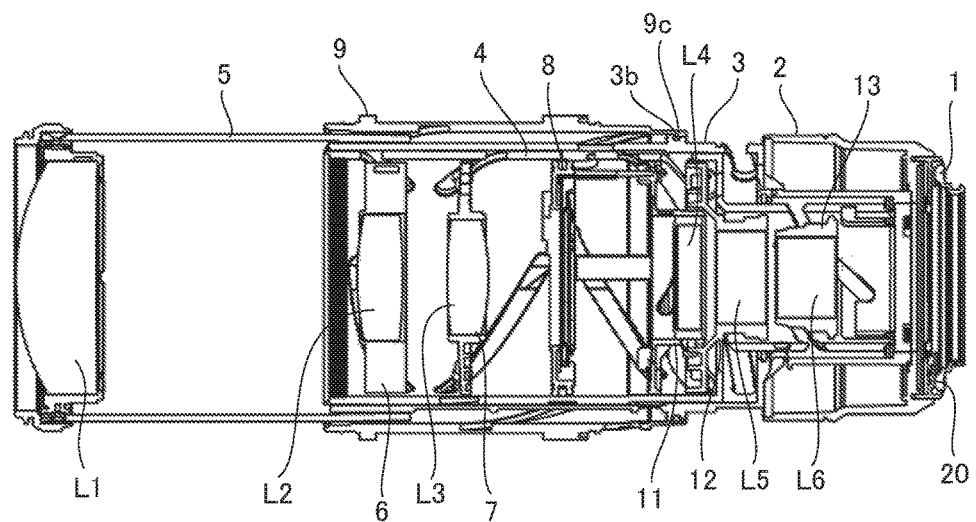
FIG. 1B is a sectional view illustrating a configuration of the interchangeable lens barrel according to the first embodiment in a telephoto state.

FIG. 1 is a sectional view illustrating a configuration of an interchangeable lens barrel to which a lens barrel according to a first embodiment of the present invention can be applied. FIG. 1A illustrates a wide state, and FIG. 1B illustrates a telephoto state. A first lens group L1, a second lens group L2, a third lens group L3, a fourth lens group L4, a fifth lens group L5, and a sixth lens group L6 constituting a imaging optical system are held in the lens barrel illustrated in FIGS. 1A and 1B. Further, this lens barrel has a mount 1, a base cylinder (cylinder member) 2, a guide cylinder (stationary cylinder) 3, a cam cylinder 4, and a rectilinear cylinder (movable cylinder) 5. Also, the lens barrel has a second lens holding frame 6, a third lens holding frame 7, a movable frame (diaphragm) 8, a zooming ring 9, a fourth lens holding frame 11, a fifth lens holding frame 12, a sixth lens holding frame 13, and an electric circuit board 20.

The first, third, fourth and sixth lens groups L1, L3, L4 and L6 move in a direction of an optical axis (hereinafter referred to as "optical axis direction") of the imaging optical system and change a magnification, and the second and fifth lens groups L2 and L5 are fixed and do not move. The sixth lens group L6 moves in the optical axis direction during zooming or focusing and adjusts a focus. The first lens group L1 is held on the rectilinear cylinder 5, and the second, third, fourth, fifth and sixth lens groups L2, L3, L4, L5 and L6 are disposed on an inner circumference of the cam cylinder 4. The base cylinder 2 is coupled with the mount 1 to serve as a base of the lens barrel, and the electric circuit board 20 is mounted on the base cylinder 2. The electric circuit board 20 performs supply of power and electrical communication when combined with a camera body (not illustrated), and carries out driving control of, for instance, an actuator (not illustrated) in an interchangeable lens of the present embodiment. The guide cylinder (stationary cylinder) 3 is fixed relative to the base cylinder 2 in the optical axis direction and a circumferential direction centering on an optical axis. The cam cylinder 4 is a cylinder member that is disposed on an inner circumference of the guide cylinder 3, is held to be rotatable relative to the guide cylinder 3, and is movable in the optical axis direction. The movable frame (diaphragm) 8 is disposed between the third lens group L3 and the fourth lens group L4, and adjusts an intensity of imaging light coming into the interchangeable lens. Also, the movable frame (diaphragm) 8 is equipped with an actuator (not illustrated), which drives diaphragm blades (not illustrated) in the movable frame (diaphragm) and adjusts an intensity of light. As a bayonet claw 9c of the zooming ring 9 and a groove 3b formed in the guide cylinder 3 are bayonet-coupled, the zooming ring 9 is allowed to rotate at a predetermined amount of rotation in a circumferential direction while movement in the optical axis direction relative to the guide cylinder 3 is obstructed, and is held on an outer circumference of the guide cylinder 3.

Figure 2:
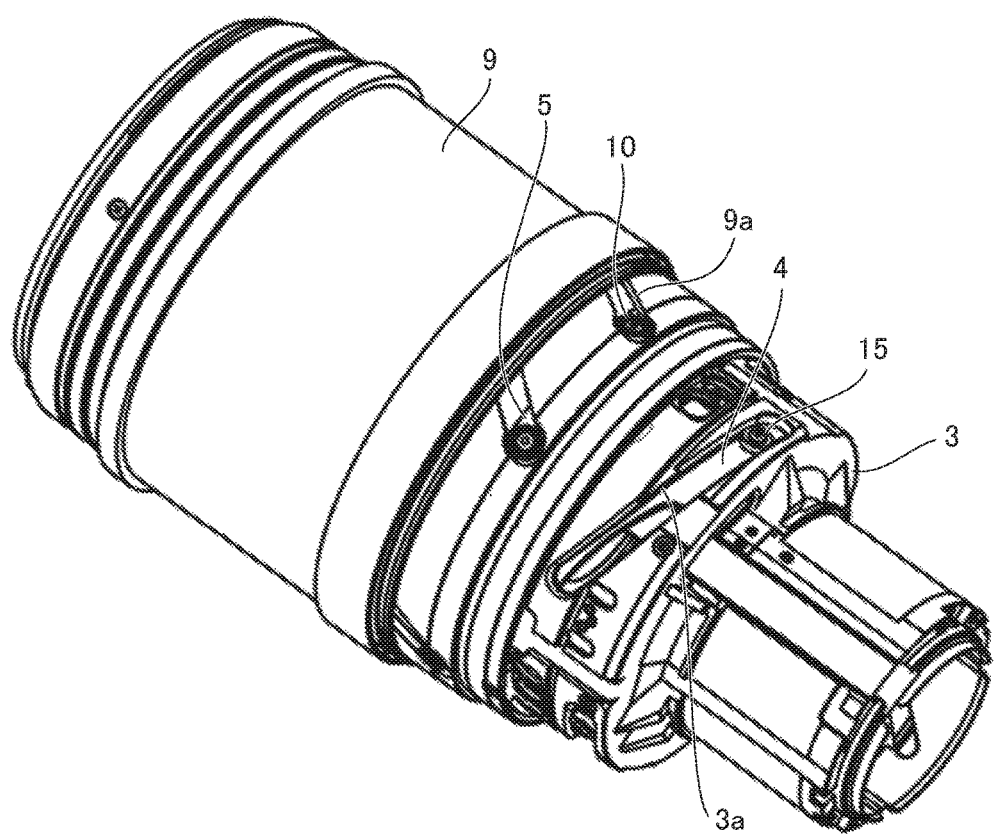
FIG. 2 is a view illustrating a state in which a zooming ring is assembled to a guide cylinder.

FIG. 2 illustrates a state in which the zooming ring 9 is assembled to the guide cylinder 3. The zooming ring 9 has six cam grooves 9a provided in an inner circumferential portion thereof with six phases in the circumferential direction centering on the optical axis. Most of the cam grooves 9a are non-through grooves in a thickness direction of the zooming ring 9, and some of the cam grooves 9a are through grooves. The cam grooves 9a are exposed at an outer surface of the zooming ring 9. Six cam followers 10 are incorporated into an outer circumferential portion of the rectilinear cylinder 5 at the exposed portions of the cam grooves 9a. Outer circumferences of the cam followers 10 are engaged with the cam grooves 9a of the zooming ring 9. Thereby, when the zooming ring 9 is rotated, the rectilinear cylinder 5 moves in the optical axis direction in tandem with this rotation without rotating in the circumferential direction.

Figure 3A:
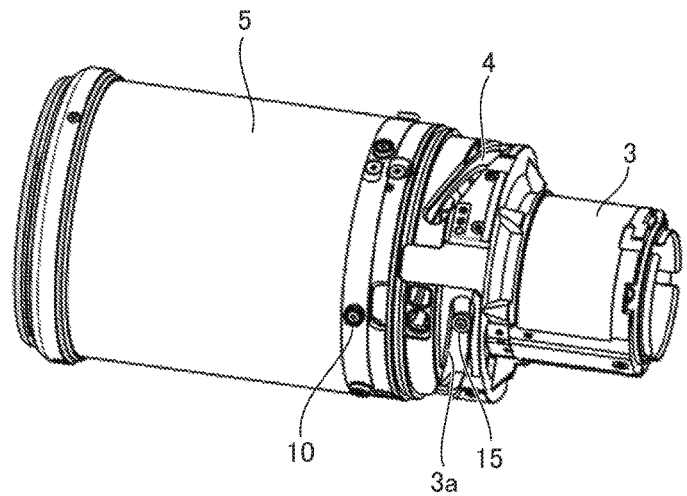
FIG. 3A is a perspective view illustrating a driving mechanism of the lens barrel according to the first embodiment in the wide state.
Figure 3B:
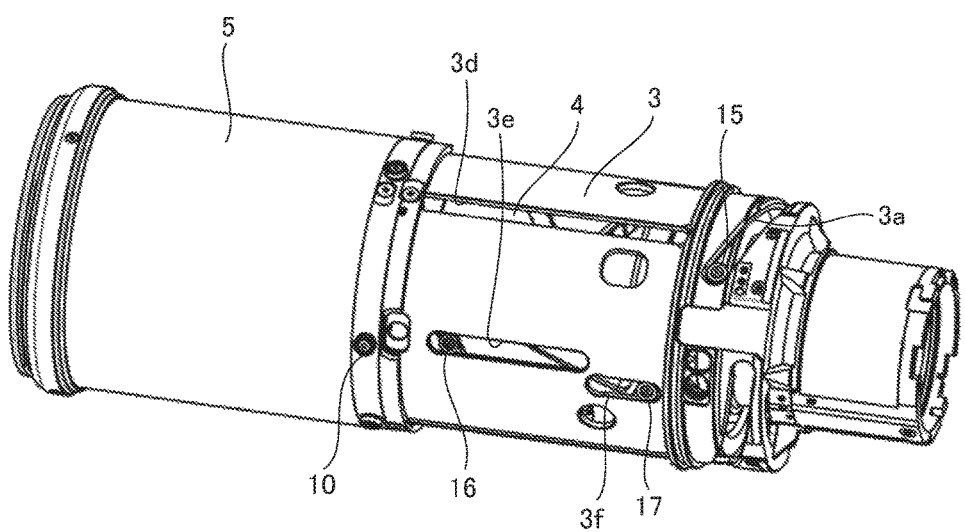
FIG. 3B is a perspective view illustrating a driving mechanism of the lens barrel according to the first embodiment in the telephoto state.

FIG. 3 is a perspective view of an interchangeable lens barrel illustrating only major components. FIG. 3A illustrates a wide state, and FIG. 3B illustrates a telephoto state. As illustrated in FIGS. 3A and 3B, the rectilinear cylinder 5 holding the first lens group L1 is disposed on the outer circumference of the guide cylinder 3. The cam followers (not illustrated) are mounted on an inner circumferential portion of the rectilinear cylinder 5 with three phases at regular intervals in the circumferential direction centering on the optical axis. Each of the cam followers is engaged with a rectilinear groove 3d of the guide cylinder 3 and the cam groove 4a of the cam cylinder 4 (not illustrated in FIG. 3). Therefore, the rectilinear cylinder 5 can move in the optical axis direction relative to the guide cylinder 3, is held to be unable to rotate about the optical axis. When the rectilinear cylinder 5 moves along a trajectory of the rectilinear groove 3d in the optical axis direction, the cam cylinder 4 rotates about the optical axis along a trajectory of the cam grooves 4a. The cam follower 15 fitted into the cam groove 3a of the guide cylinder 3 is fixed to the cam cylinder 4. When the cam cylinder 4 rotates about the optical axis, the cam follower 15 moves along a trajectory of the cam groove 3a in the optical axis direction.

Figure 4:
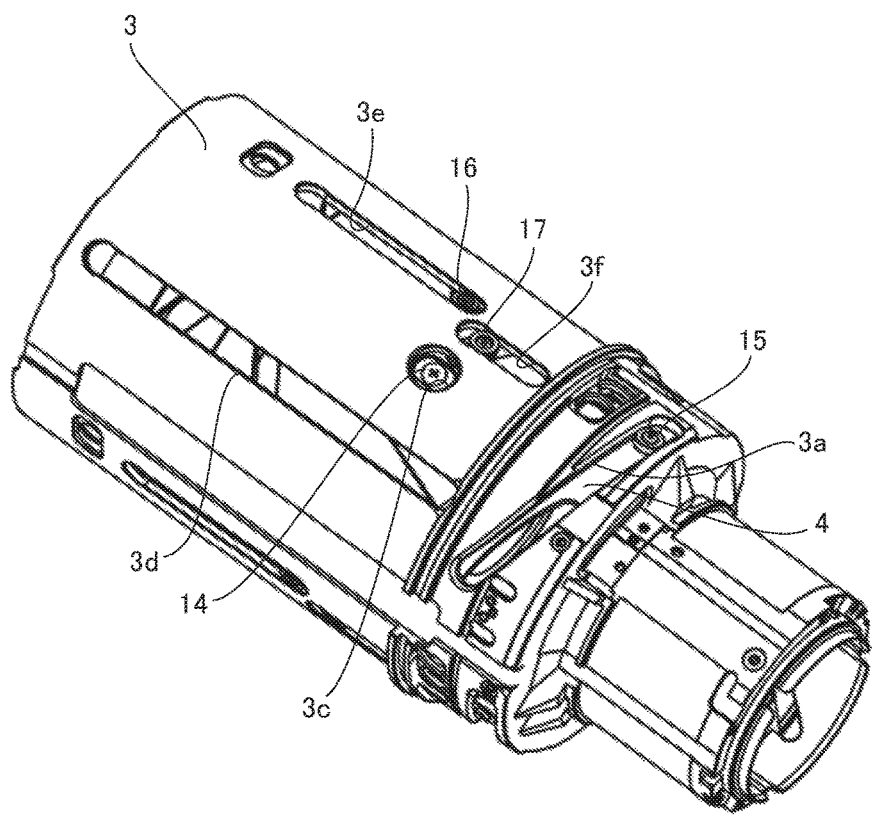
FIG. 4 is a perspective view of the interchangeable lens barrel in which a rectilinear cylinder is excluded from the interchangeable lens barrel of FIG. 3.

FIG. 4 is a perspective view of the interchangeable lens barrel in which the rectilinear cylinder 5 is excluded from FIG. 3. The guide cylinder 3 is provided with the cam grooves 3a with three phases at regular intervals in the circumferential direction centering on the optical axis, and rectilinear grooves 3d, 3e and 3f with three phases each (a total of nine phases) at regular intervals in the circumferential direction centering on the optical axis. The cam grooves 3a guide the cam cylinder 4 in the optical axis direction. Also, the rectilinear grooves 3d, 3e and 3f guide the first, third and fourth lens groups L1, L3 and L4 in the optical axis direction, respectively.

Figure 5A:
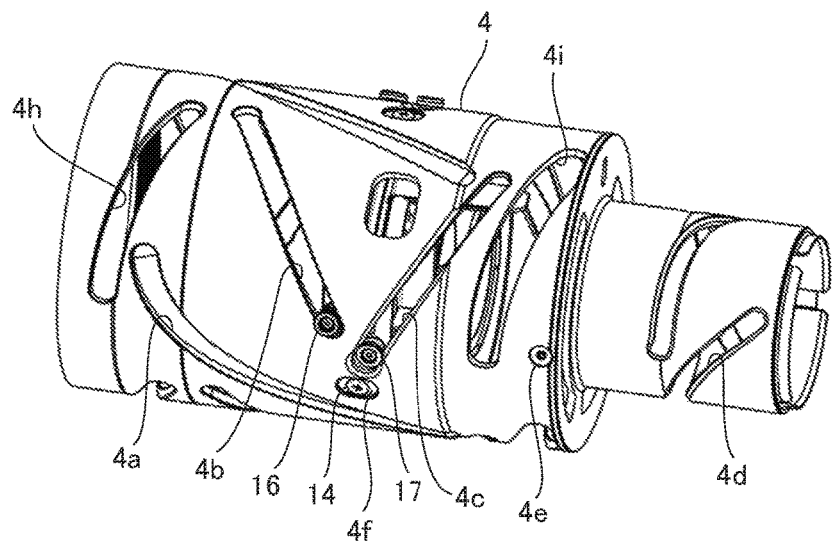
FIG. 5A is a perspective view of the interchangeable lens barrel in which a guide cylinder is additionally excluded from FIG. 4 in the wide state.
Figure 5B:
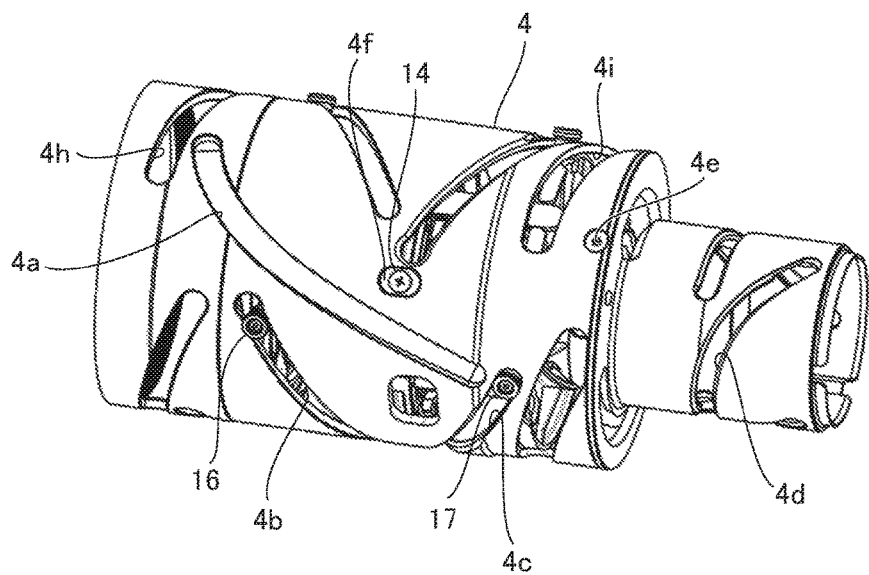
FIG. 5B is a perspective view of the interchangeable lens barrel in which a guide cylinder is additionally excluded from FIG. 4 in the telephoto state.

FIG. 5 is a perspective view of the interchangeable lens barrel in which the guide cylinder 3 is additionally excluded from FIG. 4. FIG. 5A illustrates a wide state, and FIG. 5B illustrates a telephoto state. The cam cylinder 4 is provided with cam grooves 4a, 4b, 4c and 4d with three phases each (a total of 12 phases) at regular intervals in the circumferential direction centering on the optical axis. Further, the cam cylinder 4 is provided with relief holes 4h and 4i for avoiding interference between fixture portions (not illustrated) of the second and fifth lens groups L2 and L5 that are stationary groups when the cam cylinder 4 rotates relative to the guide cylinder 3 and moves in the optical axis direction. The cam follower 16 is provided for the third lens holding frame 7 (not illustrated in FIGS. 4 and 5) holding the third lens group L3, and is engaged with the rectilinear groove 3e (FIG. 4) and the cam groove 4b (FIG. 5). Also, the cam follower 17 is provided for the fourth lens holding frame 11 (not illustrated in FIGS. 4 and 5) holding the fourth lens group L4, and is engaged with the rectilinear groove 3f (FIG. 4) and the cam groove 4c (FIG. 5). The sixth lens group L6 is held by the sixth lens holding frame 13 (not illustrated in FIG. 5), and the cam follower (not illustrated) fixed to the sixth lens holding frame 13 is fitted into the cam groove 4d.

With the configuration above, the rectilinear cylinder 5 moves in the optical axis direction by means of the rotation of the zooming ring 9. Along with this movement, the cam cylinder 4 moves in the optical axis direction while rotating in the circumferential direction. Thus, it is possible to move the lens groups L1, L3, L4 and L6 in the optical axis direction to change a magnification. During zooming, the sixth lens holding frame 13 moves in the optical axis direction without rotating in the circumferential direction centering on the optical axis due to a rotation regulatory structure (not illustrated). Also, when a rotating force is given by a mechanism (not illustrated) during focusing, the sixth lens holding frame 13 moves along the trajectory of the cam groove 4d in the optical axis direction while rotating about the optical axis.

Figure 6:
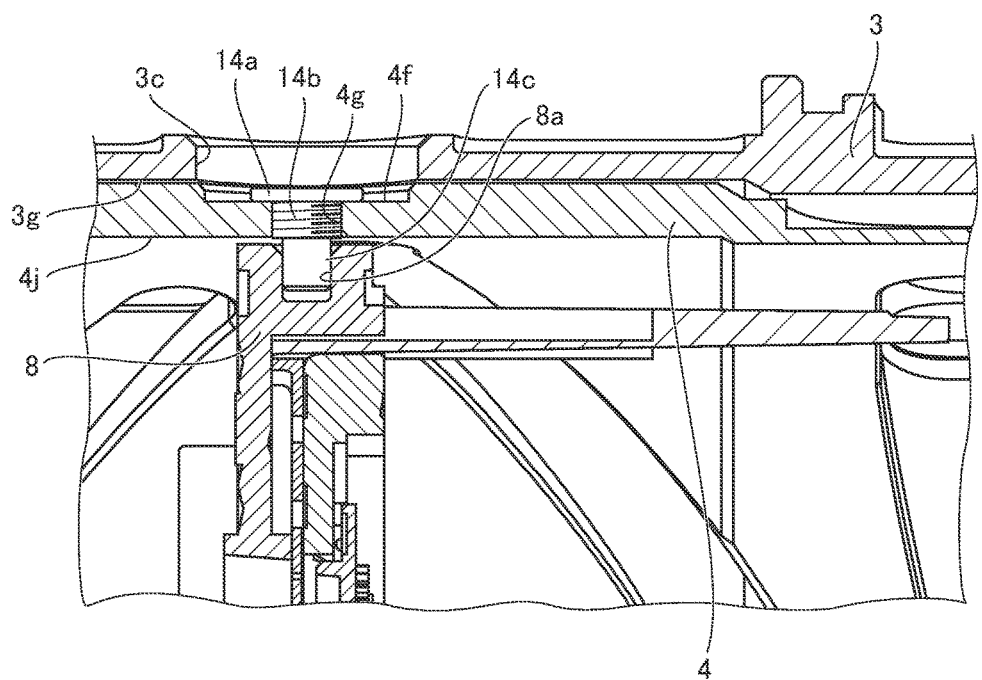
FIG. 6 is a sectional view of an engagement portion between a cam cylinder and a movable frame (diaphragm).

Next, a driving mechanism of the movable frame (diaphragm) 8 will be described in detail. FIG. 6 is a sectional view of an engagement portion between the cam cylinder 4 and the movable frame (diaphragm) 8. The guide cylinder 3 has a hole 3c and an inner circumferential portion 3g, and the cam cylinder 4 has a recess 4f, a hole 4g, and an inner circumferential portion 4j. The movable frame (diaphragm) 8 has three grooves 8a extending in a (non-parallel) direction perpendicular to the optical axis at an outer circumferential portion thereof. A screw (fitted member) 14 has a head portion of the screw (screw head portion) 14a, a screw portion 14b (with screw grooves), and a shaft portion 14c. A dimension of an outer circumference of the shaft portion 14c is set to be smaller than an outer diameter of the screw portion 14b. For this reason, it is possible to fit the screw portion 14b into the hole 4g from an outer circumference side of the cam cylinder 4 to fix the screw (fitted member) 14 to the cam cylinder 4. The shaft portion 14c is firmly fitted into the groove 8a of the movable frame (diaphragm) 8. A dimension of an outer circumference of the shaft portion 14c is adapted to have the same diameter as or to be slightly smaller than a dimension of a width of the groove 8a. Also, when the cam cylinder 4 rotates to move in the optical axis direction, the recess 4f is provided at the outer circumferential portion of the cam cylinder 4 such that the screw head portion 14a does not interfere with the inner circumferential portion 3g of the guide cylinder 3, and the screw head portion 14a is adapted to be housed in the recess 4f. When the screw (fitted member) 14 is fitted into the cam cylinder 4, it is fitted through the hole 3c provided in the guide cylinder 3.

Figure 7A:
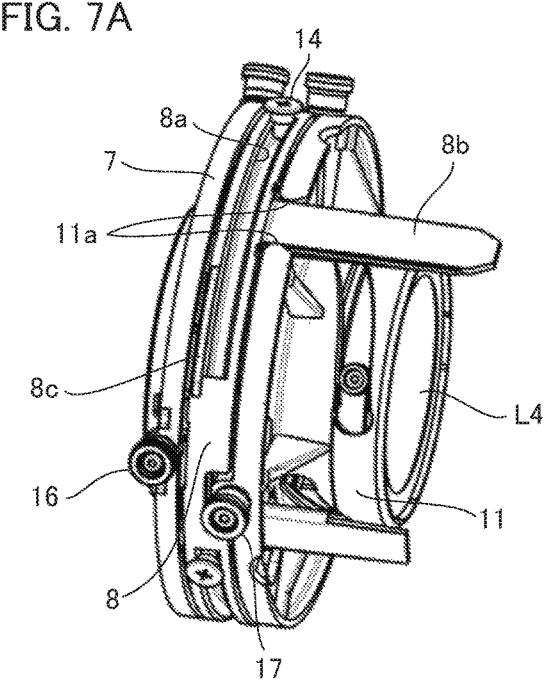
FIG. 7A is a view illustrating a relation among a lens holding frame, the movable frame (diaphragm), and a lens holding frame in the wide state.
Figure 7B:
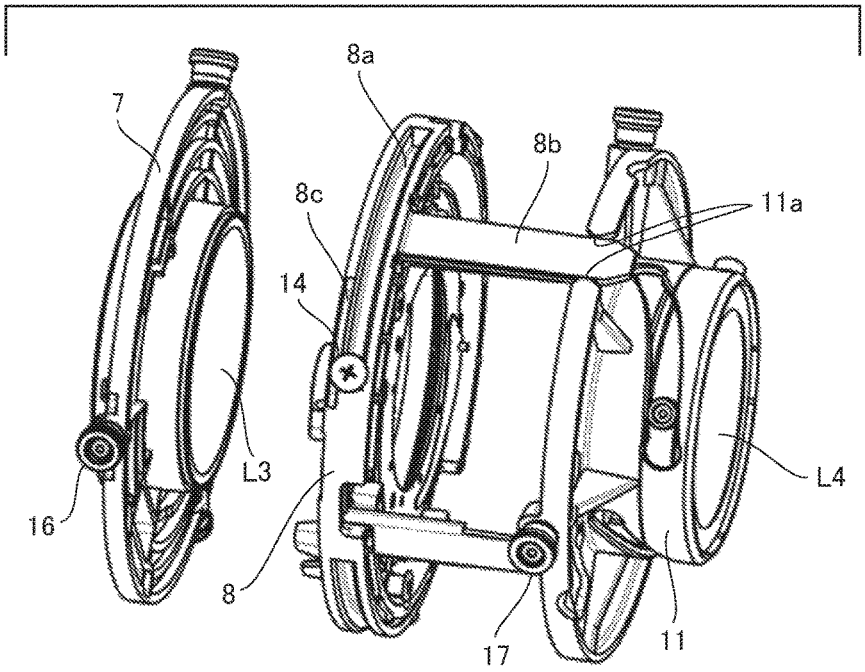
FIG. 7B is a view illustrating the relation among the lens holding frame, the movable frame (diaphragm), and the lens holding frame in the telephoto state.

FIG. 7 is a view illustrating that the lens holding frame 7, the movable frame (diaphragm) 8, and the lens holding frame 11 are disposed at adjacent positions. FIG. 7A illustrates a wide state, and FIG. 7B illustrates a telephoto state. The movable frame (diaphragm) 8 is provided with a bridge portion 8b that extends in the optical axis direction in order to restrict rotation in the circumferential direction centering on the optical axis, and a fitting protrusion 8c formed at an outer circumferential portion thereof. The fitting protrusion 8c is fitted with the inner circumferential portion 4j of the cam cylinder 4. A part of the fourth lens holding frame 11 holding the fourth lens group L4 has a gap 11a. The bridge portion 8b is fitted into the gap 11a provided in the fourth lens holding frame that is in a position adjacent to the movable frame (diaphragm) 8. Thereby, the movable frame (diaphragm) 8 and the lens holding frame 11 are connected. A dimension of a width of the gap 11a is set to be equal to or slightly greater than a dimension of a width of the bridge portion 8b. As the cam follower 17 is fitted into the rectilinear groove 3f, rotation of the fourth lens holding frame 11 in the circumferential direction is restricted. Accordingly, the movable frame (diaphragm) 8 is held to be able to move only in the optical axis direction without rotating in the circumferential direction relative to the guide cylinder 3.

When the cam cylinder 4 moves in the optical axis direction while rotating in the circumferential direction, the screw (fitted member) 14 integrated into the cam cylinder 4 also rotates in the circumferential direction along with the cam cylinder 4 and moves in the optical axis direction. Since the shaft portion 14c of the screw (fitted member) 14 is fitted with the groove 8a of the movable frame (diaphragm) 8, the movable frame (diaphragm) 8 moves by an amount that is the same as an amount of movement of the cam cylinder 4 in the optical axis direction. At this time, since the movable frame (diaphragm) 8 is subjected to regulation of rotation about the optical axis by the gap 11a of the fourth lens holding frame 11, the movable frame (diaphragm) 8 does not rotate in the circumferential direction.

According to the configuration described above, no cams for driving the movable frame (diaphragm) 8 need be provided for the cam cylinder 4. For this reason, it is possible to provide the lens barrel in which the number of cam grooves provided in the cam cylinder 4 is reduced and the length of the cam cylinder 4 in the optical axis direction and diameter of the cam cylinder 4 are reduced.

Instead of reducing the number of cam grooves, the groove 8a needs to be provided for the movable frame (diaphragm) 8. However, the groove 8a is a groove for fitting the shaft portion 14c of the screw (fitted member) 14 and a groove provided in a circumference. Thus, it is unnecessary to thicken the movable frame (diaphragm) 8 in the optical axis direction. Accordingly, like the present embodiment, even when the third lens holding frame 7 and the fourth lens holding frame 11 are brought close in a zoom state, the movable frame (diaphragm) 8 can be disposed between these with a small space.

Figure 8:
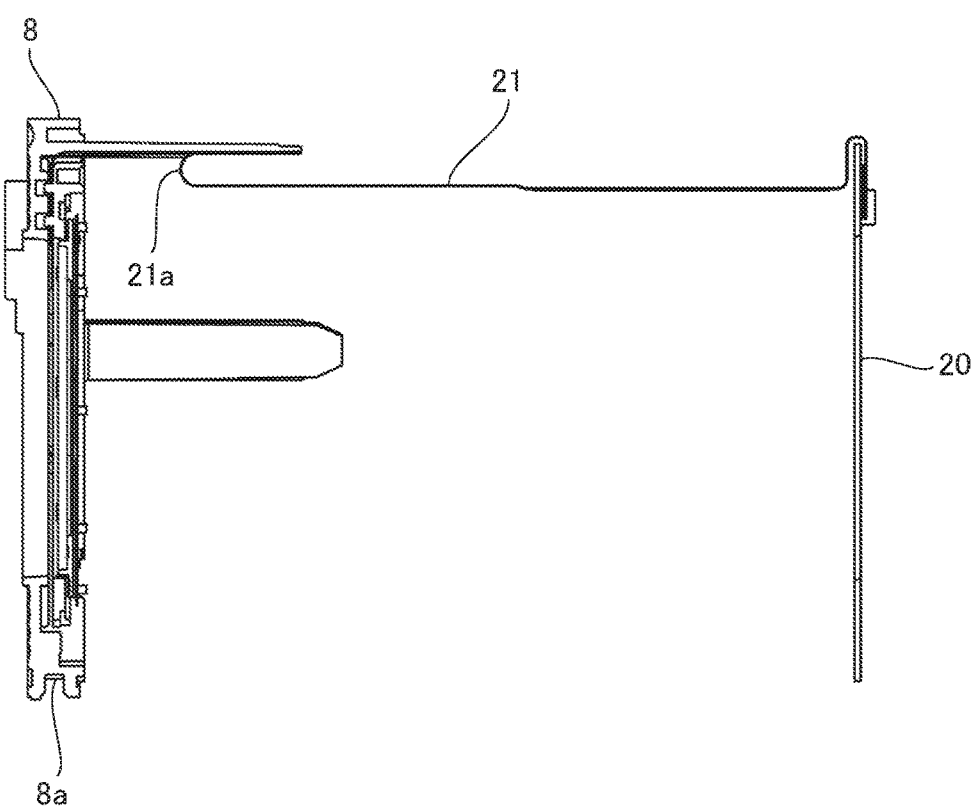
FIG. 8 is a view illustrating a state in which the movable frame (diaphragm), a flexible board, and an electric circuit board are connected.

FIG. 8 is a view illustrating a state in which the movable frame (diaphragm) 8, a flexible board 21, and an electric circuit board are connected. The flexible board 21 supplies power to an actuator via a connection path (connecting unit), and has a tip that extends in the optical axis direction and is connected to the electric circuit board 20 and a bent portion 21a.

The configuration in which the movable frame (diaphragm) 8 does not rotate in the circumferential direction has an advantage that a connection path (connecting unit) between the flexible board 21 and the electric circuit board 20 is simplified. In a configuration in which the movable frame (diaphragm) 8 rotates about the optical axis, the flexible board 21 drawn from the movable frame (diaphragm) 8 also results in rotating about the optical axis along with the movable frame (diaphragm) 8. In that case, there is a problem that the connection path between the flexible board 21 and the electric circuit board 20 needs a path that allows the rotation about the optical axis and absorbs the movement in the optical axis direction, which is very complicated. However, in the configuration of the present embodiment, it is sufficient to consider only the path (bent portion 21a) absorbing the movement in the optical axis direction.

In the present embodiment, of the movable frame (diaphragm) 8 and the cam cylinder 4, the movable frame (diaphragm) 8 located inside is provided with the groove 8a in a part of the outer circumferential portion thereof, and the cam cylinder 4 is provided with the hole 4g. However, the cam cylinder 4 located outside may be provided with the groove in a part of the inner circumferential portion thereof, and the movable frame (diaphragm) 8 may be provided with the hole. That is, if any one of the movable frame (diaphragm) 8 and the cam cylinder 4 is provided with the groove and the other is provided with the hole, the same effects as in the present embodiment are exerted.

In the present embodiment, the configuration in which the amount of movement of the movable frame (diaphragm) 8 is made equal to the amount of movement of the cam cylinder 4 in the optical axis direction has been described. However, the present invention can be applied to not only the movable frame (diaphragm) 8 but also the lens holding frame. In that case, it is unnecessary to consider the connection path of the flexible board 21. However, it is possible to move the lens groups in the optical axis direction without rotating the lens groups in the circumferential direction, which also contributes to stabilization of optical performance.

Also, as long as the length of the movable frame (diaphragm) 8 in the optical axis direction can be allowed, the groove 8a of the movable frame (diaphragm) 8 may also be a groove having a lift in the optical axis direction. The same effects as in the present embodiment are exhibited in that case. Further, the grooves 8a may be one groove covering the entire circumference of the movable frame (diaphragm) 8a.

Also, the fitted member need not be the screw, and the screw portion 14b of the screw (fitted member) 14 may be a pin that is a cylinder. Thus, the cylinder may be configured to be inserted into the hole 4g under pressure.

While the exemplary embodiment of the present invention has been described, the present invention is not limited to this embodiment, and various modifications or alterations are possible within the gist of the present invention.

This application claims the benefit of Japanese Patent Application No. 2014-249776 filed Dec. 10, 2014, which is hereby incorporated by reference herein in its entirety.

What is claimed is:

1. A lens device comprising:
an imaging optical system;
a cylinder member, including a hole, that moves in a direction of an optical axis of the imaging optical system and that rotates about the optical axis;
a movable frame, including a groove, that moves in the direction of the optical axis of the imaging optical system and that is located inside of the cylinder member; and
a fastener that includes a shaft portion, which passes through the hole, contacting the groove of the movable frame.

2. The lens device according to claim 1, wherein the groove is not parallel to the direction of the optical axis.

3. The lens device according to claim 1, further comprising:
a lens holding frame configured to hold a lens; and
a bridge portion configured to extend in the direction of the optical axis and connect the movable frame and the lens holding frame, and restrict rotation of the movable frame about the optical axis.

4. The lens device according to claim 1, wherein:
the fastener has a head portion having a greater diameter than that of the shaft portion, and
the cylinder member has a recess portion housing the head portion.

5. The lens device according to claim 1, wherein:
the fastener has a screw portion with screw grooves, and
the screw portion is fitted into the hole.

6. The lens device according to claim 5, wherein the screw portion is provided on a surface of the shaft portion in contact with the hole.

7. The lens device according to claim 1, wherein the movable frame holds a diaphragm mechanism that adjusts an amount of light using a plurality of diaphragm blades.

8. The lens device according to claim 7, wherein:
the diaphragm mechanism has an actuator that drives the plurality of diaphragm blades; and
the lens device includes a board configured to perform supply of power to the actuator, and a connecting unit configured to perform the supply of power to the actuator from the board.

9. The lens device according to claim 1, wherein:
the lens device includes a stationary cylinder that does not move during zooming; and
the movable frame is configured to move relative to the stationary cylinder during zooming.

10. An optical apparatus comprising:
an image pickup element; and
a lens device configured to lead a luminous flux from an object to the image pickup element,
wherein the lens device comprises:
an imaging optical system;
a cylinder member, including a hole, that moves in a direction of an optical axis of the imaging optical system and that rotates about the optical axis;
a movable frame, including a groove, that moves in the direction of the optical axis of the imaging optical system and that is located inside of the cylinder member; and
a fastener that includes a shaft portion, which passes through the hole and contacts the groove of the movable frame.

11. The lens device according to claim 2, wherein the groove extends in a direction perpendicular to the direction of the optical axis.

12. The lens device according to claim 11, wherein a movement amount of the movable frame in the direction of the optical axis is same as a movement amount of the cylinder member in the direction of the optical axis.

13. The lens device according to claim 2, wherein the groove is inclined relative to the optical axis.

* * * * *